United States Patent  
Pastusiak et al.

(10) Patent No.: US 8,224,754 B2
(45) Date of Patent: Jul. 17, 2012

(54) GENERATION, DISTRIBUTION AND VERIFICATION OF TOKENS USING A SECURE HASH ALGORITHM

(75) Inventors: Andrzej Pastusiak, Bellevue, WA (US); Arun K. Sacheti, Sammamish, WA (US); Ting Cai, Redmond, WA (US); Deuane Martin, Seattle, WA (US); Josh D. Benaloh, Redmond, WA (US); Rajesh Kuppuswamy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1517 days.

(21) Appl. No.: 11/013,199

(22) Filed: Dec. 15, 2004

(65) Prior Publication Data

US 2006/0129501 A1    Jun. 15, 2006

(51) Int. Cl.
*G06Q 20/00* (2012.01)
*G06Q 30/00* (2012.01)
(52) U.S. Cl. ............... 705/69; 705/14.1; 705/64
(58) Field of Classification Search ............. 705/14, 705/69, 14.1, 64
See application file for complete search history.

(56) References Cited

U.S. PATENT DOCUMENTS

| 6,076,069 | A  | * | 6/2000  | Laor ........................ 705/14 |
| 6,360,206 | B1 | * | 3/2002  | Yamashita ................ 705/14 |
| 6,829,355 | B2 | * | 12/2004 | Lilly ........................ 380/28 |
| 6,839,683 | B1 | * | 1/2005  | Walker et al. ............. 705/14 |
| 7,013,286 | B1 | * | 3/2006  | Aggarwal et al. ......... 705/14.26 |
| 7,983,987 | B2 | * | 7/2011  | Kranzley et al. ........... 705/44 |
| 2002/0010627 | A1 | * | 1/2002  | Lerat ........................ 705/14 |
| 2002/0147636 | A1 | * | 10/2002 | Modani et al. ............. 705/14 |
| 2004/0133782 | A1 | * | 7/2004  | Sander et al. ............. 713/170 |
| 2004/0146164 | A1 | * | 7/2004  | Jonas et al. ............... 380/284 |

OTHER PUBLICATIONS

"A Lightweight Protocol for the Generation and Distribution of Secure Ecoupons", Blundo, Carlo, Stelvio Cimato, and Annalisa De Bonis. Published in Proceedings of WWW 2002, ACM. 2002.*
"The Caesar Cipher"—Internet Archive of page from 2002.*
RFC 1321—The MD5 Message-Digest Algorithm. Rivest, Ron. Apr. 1992.*
"Hashing Passwords, The AllowPartiallyTrustedCallers Attribute", MSDN Magazine, Aug. 2003.*
.NET Framework Class Library—SHA1CryptoServiceProvider Class. Available at <http://msdn.microsoft.com/en-us/library/system.security.cryptography.sha1cryptoserviceprovider.aspx>. Entire document cited and enclosed.*
"The MD5 Message-Digest Algorithm", Request for Comment 1321. Rivest, Ron. Apr. 1992. Entire document cited and enclosed.*
InformIT Magazine online—"Java—One-Way Encryption". Jan. 1, 2004. Available at <http://www.informit.com/guides/content.aspx?g=java&seqNum=30>.*
FIPS 180-2—"Secure Hash Standard". NIST Publication, Aug. 1, 2002. Available at <http://www.nist.gov>. Entire document cited and included.*
Cryptography. (2000). In The Penguin English Dictionary. London: Penguin. Retrieved Feb. 3, 2009, from http://www.credoreference.com/entry/1131950/.*

(Continued)

*Primary Examiner* — James A Reagan
*Assistant Examiner* — Calvin Cheung
(74) *Attorney, Agent, or Firm* — Lee & Hayes, PLLC

(57) ABSTRACT

Methods, systems, and apparatus for generation, distribution and verification of tokens are described. In an implementation, a method is described in which a value of an offer is determined and a token for representing the offer is generated. The token has a number of characters based on the determination of the value of the offer.

16 Claims, 9 Drawing Sheets

OTHER PUBLICATIONS

Internet Archive Wayback Machine archive of "An Overview of Cryptography", Kessler, Gary. Feb. 15, 2001. Available at <http://web.archive.org/web/20010220174846/http://www.garykessler.net/library/crypto.html>. Entire document cited and included.*

Internet Archive Wayback Machine archive of "Generating a Random 32-bit Identifier", from Connected: An Internet Encyclopedia. Nov. 7, 2002. Available at <http://web.archive.org/web/20021107103419/http://www.freesoft.org/CIE/RFC/1889/56.htm>.*

"How does the new Windows Product Activation (WPA) scheme work?", Internet Archive Wayback Machine archive of <http://web.archive.org/web/20020611212240/http://www.yak.net/fqa/256.html>. Archived Jun. 11, 2002.*

How Computers Work, Millennium Edition. White, Ron. QUE Publishing, Indianapolis, USA, 1999. Front matter, pp. 60-63, 76-101, table of contents, back matter included. ISBN: 0-7897-2112-0.*

How Computers Work: Processor and Main Memory. Young, Roger. 2001. pp. 1-158 cited.*

How Computers Work, Millennium Edition. White, Ron. Que Corporation, 1999. ISBN 0-7897-2112-0. Entire book cited.*

Handbook of Applied Cryptography. Menezes et al. CRC Press, 1996. Entire work cited. Available from <http://www.cacr.math.uwaterloo.ca/hac>.*

Electronic Payment Systems for E-Commerce, second edition. O'Mahony et al. Artech House, Boston, MA, 2001. ISBN 1-58053-268-3. Entire work cited.*

Axelsson, et al., "An Approach to UNIX Security Logging", Proceedings of the 21st National Information Systems Security Conference, Crystal City, Arlington, Virginia, Oct. 5-8, 1998, pp. 62-75.

"Run the Fdisk Program, Format the Hard Disk, and Reload Windows 98 or Windows 95 on a Portable Computer Using the Solo Boot Disk", retrieved on Dec. 10, 2008 at <<http://web.archive.org/web/20021022173206/http://support.gateway.com/s/Mobile/SHARED/Newbootdisk/shtml>>, Internet Archive Wayback Machine's archive, Archived Oct. 22, 2002, pp. 1-4.

Blundo, et al., "A Lightweight Protocol for the Generation and Distribution of Secure E-coupons", ACM, 2002, pp. 542-552.

Brown, "Hashing Passwords, The Allow Partially TrustedCallers Attribute", at <<http://msdn.microsoft.com/msdnmag/issues/03/08/SecurityBriefs/default.aspx?print=true>>, pp. 1-2.

Rivest, "RFC 1321—The MD5 Message-Digest Algorithm", at <<http://www.faqs.org/rfcs/rfc1321.html (1 of 25) Feb. 15, 2008 11:41:45 AM>>, 1992, pp. 1-9.

"Windows 98 Getting Started Guide", at <<http://www.microsoft.com/technet/archive/win98/proddocs/getstart/front.mspx>>, pp. 1-7.

O'Mahony et al.,"Electronic Payment Systems", Artech House Publishers, Boston 1997, ISBN 0-89006-925-5, pp. 146-159 & pp. 228-237.

* cited by examiner

| A | B | C | D | E | G | H |
|---|---|---|---|---|---|---|
| No. Char | Length | Bit Length | Sample Space | Redeemable Quantity | Number of Guesses | Probability of Guess One Token |
| 22 | 10 | 44 | 17,592,186,044,416 | 500,000,000 | 1,000,000 | 99.9999999954700% |
| 22 | 11 | 49 | 562,949,953,421,312 | 500,000,000 | 1,000,000 | 58.8595685367972000% |
| 22 | 15 | 66 | 73,786,976,294,838,200,000 | 500,000,000 | 1,000,000 | 0.0006776223309910% |

GENERATION, DISTRIBUTION AND VERIFICATION OF TOKENS USING A SECURE HASH ALGORITHM

TECHNICAL FIELD

The present invention generally relates to tokens and more particularly relates to generation, distribution and verification of tokens using a secure hash algorithm.

BACKGROUND

The number of goods and services that are available via online commerce (i.e., e-commerce) is ever increasing. For example, consumers may interact with a wide variety of web sites over the Internet to purchase books, software, music, content subscriptions (e.g., streaming audio and video), and so forth. To increase traffic to web sites which provide these goods and services, the web sites may distribute offers for access to the goods and services, such as "10% off all purchases", "free shipping", and so on. In another instance, "special" offers may be provided to consumers for continued loyalty, such as by providing a free gift after the purchase of a predetermined number of goods or services.

To protect these offers from attack and unauthorized distribution, tokens may be used to represent these offers for communication to the respective web sites. Thus, the tokens may be used to represent monetary values in online commerce systems. Tokens may take a variety of forms, such as by a string of characters that is entered by a user to represent the monetary value. However, like other forms of online communication, tokens may be attacked by malicious parties to gain unauthorized access to the offer.

Therefore, there is a continuing need for methods, systems, and apparatus for generation, distribution and verification of tokens such that the tokens are protected from malicious parties.

SUMMARY

Methods, systems, and apparatus for generation, distribution and verification of tokens are described. In an implementation, a method is described in which a value of an offer is determined and a token for representing the offer is generated. The token has a number of characters based on the determination of the value of the offer. In another implementation, a method includes generating a hash value for a token using a secure hash algorithm, such as U.S. Secure Hash Algorithm Version 1.0 (SHA-1). The hash value is stored in a database for verifying the token when the token is communicated over a network. In a further implementation, a method includes distributing a medium having a token that is configured for verification over a network using a secure hash algorithm and relates to an offer for a good or service. In yet another implementation, a method includes generating a hash value from a token using a secure hash algorithm (SHA). The generated hash value is compared with a database of hash values to find a match and, when a match is found, implementation of a corresponding offer that relates to a good or service is permitted.

BRIEF DESCRIPTION OF THE DRAWINGS

FIG. 9 is an illustration of a table in an exemplary implementation which describes a probability that an attacker can guess one redeemable token given a total number of redeemable tokens in circulation and a number of guesses attempted by the attacker.

The same reference numbers are utilized in instances in the discussion to reference like structures and components.

DETAILED DESCRIPTION

Overview

Methods, systems, and apparatus for generation, distribution and verification of tokens are described. Tokens are typically used in online commerce systems to represent a monetary value of an offer, such as "10% off", "buy one get one free", and so on. However, long tokens (i.e., tokens having many characters) are typically difficult to use and discourage users from participating in online commerce. On the other hand, short tokens (i.e., tokens having fewer characters) are typically more easily attacked by malicious parties. Therefore, in an implementation, a variable length token system is described which is executable to vary a length of a token in response to its value. For example, tokens that represent offers with a high monetary value may be longer (i.e., have more characters) than tokens which represent offers with a lower monetary value. An offer for "10% off", for instance, may be represented by a token that is shorter than a token which represents a purchase of a good or service, such as a prepaid phone card. In this way, the consumer may more easily enter the token for the "10% off" offer and is therefore more likely to utilize the token, while the token for the purchased good for service has greater protection against attack and also reflects that the consumer is more willing to enter additional characters to obtain the purchased good or service. Further discussion of the computation of a number of characters for inclusion in a token may be found in relation to FIGS. 4 and 7.

In another implementation, tokens themselves are not stored in an accessible database. For example, a database may be accessible over a network for verifying tokens. However, if a malicious party gains access to a database which stores the tokens, the malicious party may then have access to all the tokens contained therein. The likelihood of such an attack may be increased as the value of the tokens stored in the database increases. Therefore, a token verification system may be utilized which stores hash values of the tokens which are then utilized to verify tokens communicated over the network. Thus, the tokens themselves may be protected against attack. Further discussion of the generation and storage of hash values may be found in relation to FIGS. 3 and 7.

Exemplary Environment

Figure 1:
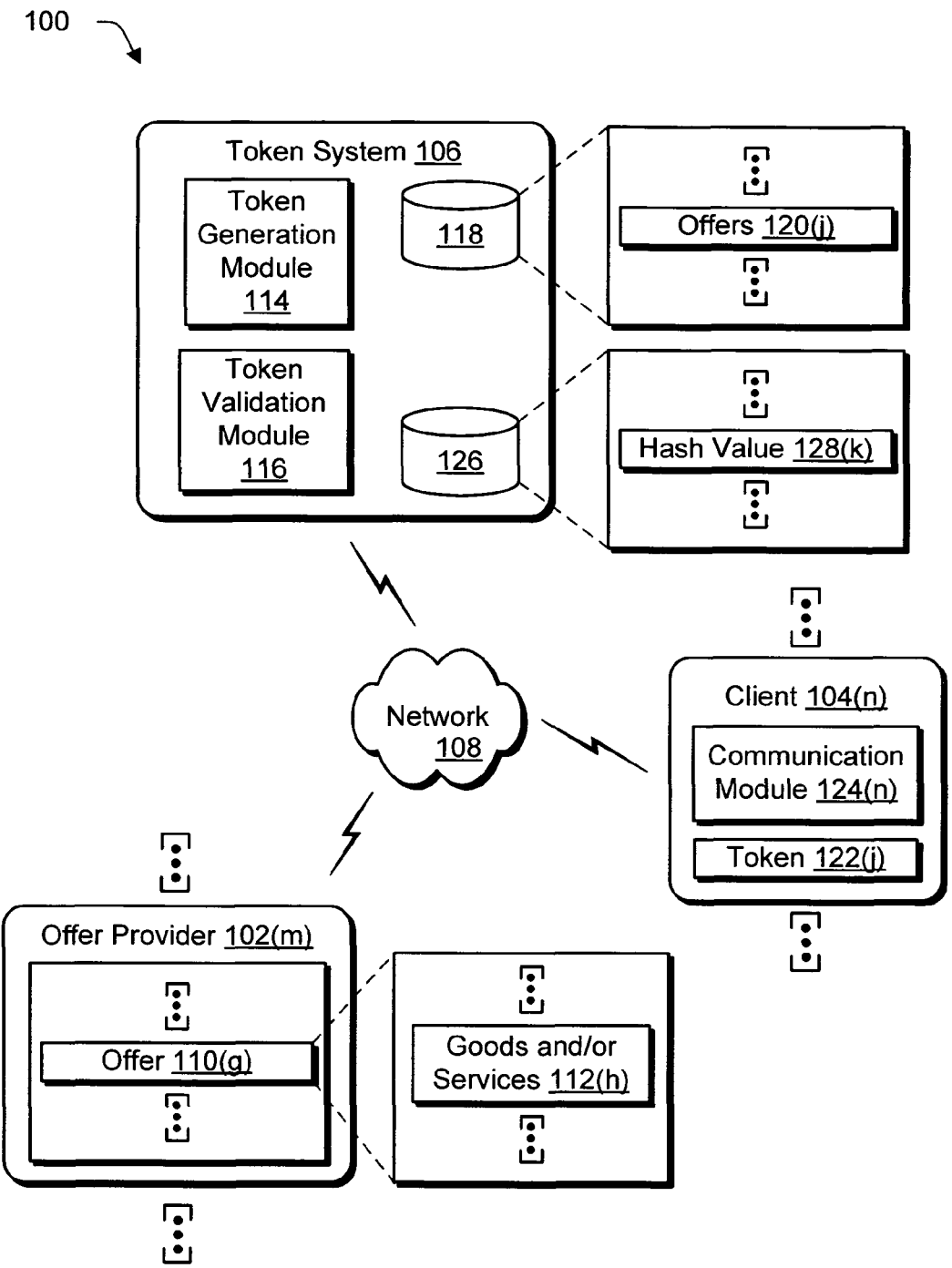
FIG. 1 is an illustration of an environment in an exemplary implementation that is operable to employ the generation, distribution, and verification techniques for tokens.

FIG. 1 is an illustration of an environment 100 in an exemplary implementation that is operable to employ the generation, distribution, and verification techniques for tokens. The illustrated environment 100 includes a plurality of offer providers 102(m) (where "m" can be any integer from one to "M") a plurality of clients 104(n) (where "n" can be any integer from one to "N") and a token system 106, each of which are communicatively coupled, one to another, over a network 108. The clients 104(n) may be configured in a variety of ways. For example, the client 104(n) may be configured as a computer that is capable of communicating over the network 108, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to a low-resource device with limited memory and/or processing resources (e.g., traditional set-top boxes, hand-held game consoles). The clients 104(n) may also relate to a person and/or entity that operate the clients. In other words, clients 104(n) may describe logical clients that include users and/or devices.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks. For instance, offer provider 102(m) and token system 106 may be communicatively coupled via a corporate Intranet to communicate, one to another. Additionally, the offer providers 102(m) and the token system 106 may be communicatively coupled to the clients 104(n) over the Internet. A wide variety of other instances are also contemplated.

The offer provider 102(m) is illustrated as including a plurality of offers 110(g), where "g" can be any integer from one to "G". Each of the offers 110(g) corresponds to one or more of a plurality of goods and/or services, which are illustrated collectively in FIG. 1 as "goods and/or services 112(h)", where "h" can be any integer from one to "H". The goods may represent goods (e.g., such as books, digital video discs (DVDs), automobiles, and so forth) which are available for purchase (e.g., directly, via auction, and so on), rental, and so on by the plurality of clients 104(n). The plurality of services may represent services which are available for access by the clients 104(n). For example, the services may include services which are accessible to the client 104(n) over the network 108, such as to stream audio and/or video data, download programs, online games, and so on. The services may also include services which are available for purchase over the network 108, but which are then provided via other techniques, such as subscriptions to television programming, purchase of a wireless phone calling plan, and so on.

Although the offer provider 102(m) is illustrated as referencing both goods and services, the goods and services may be provided via one or more distinct systems.

The token system 106 includes a token generation module 114 and a token validation module 116. The token generation module 114 generates tokens for distribution to the plurality of clients 104(n) to implement the offer 110(g), such as to purchase good and services utilizing a reduction in price specified by the offer 110(g). For example, the token generation module 114 may access a database 118 having a plurality of offers 120(j), where "j" can be any integer from one to "J", which are locally stored copies of the offers 110(g) obtained from the offer provider 102(m). As previously described, the offers 120(j) may include offers which describe an adjustment in a purchase price of the goods 110(g) or services 112(h), e.g., "two-for-one", "10% off", "free trial offer" and so on. The token generation module 114 may then examine these offers 120(j) and generate a corresponding token 122(j) for distribution to the client 104(n). The token 122(j) may be distributed in a variety of ways, further discussion of which may be found in relation to FIG. 5.

To utilize the offer 110(g), the client 104(n) may execute a communication module 124(n) for communication of the token 122(j) over the network 108 to the token system 106. The token system 106 executes the token validation module 116 for validating the token 122(j). For example, the token system 106 may include a database 126 having a plurality of hash values 128(k), where "k" can be any integer from one to "K". Each of the plurality of hash values 128(k) corresponds to a token previously generated by the token generation module 114. As previously described, rather than store the tokens themselves in the database 126, and therefore expose the tokens to possible attack from malicious parties, hash values 128(k) computed from the tokens are stored in the database 126. For instance, a secure hash algorithm (e.g., U.S. Secure Hash Algorithm Version 1.0 (SHA-1)) may be utilized to compute the hash values 128(k) such that each of the hash values 128(k) is an irreversible digital signature of the corresponding token. Thus, the hash values 128(k) cannot be utilized to "reverse" the digital signature to obtain the token in its original form, which therefore protects the tokens from malicious parties. For example, even if a malicious party obtains access to the database 126, and consequently the hash values 128(k) in the database 126, the original tokens cannot be computed from the hash values 128(k). Therefore, the malicious party does not obtain access to the token which are needed for verifying access to the offers 110(g). Further discussion of the execution of the token validation module 116 and secure hash algorithms may be found in relation to FIGS. 2, 6 and 7.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the generation, distribution and verification techniques described below are platform-independent, meaning that the techniques may be implemented on a variety of commercial computing platforms having a variety of processors.

Figure 2:
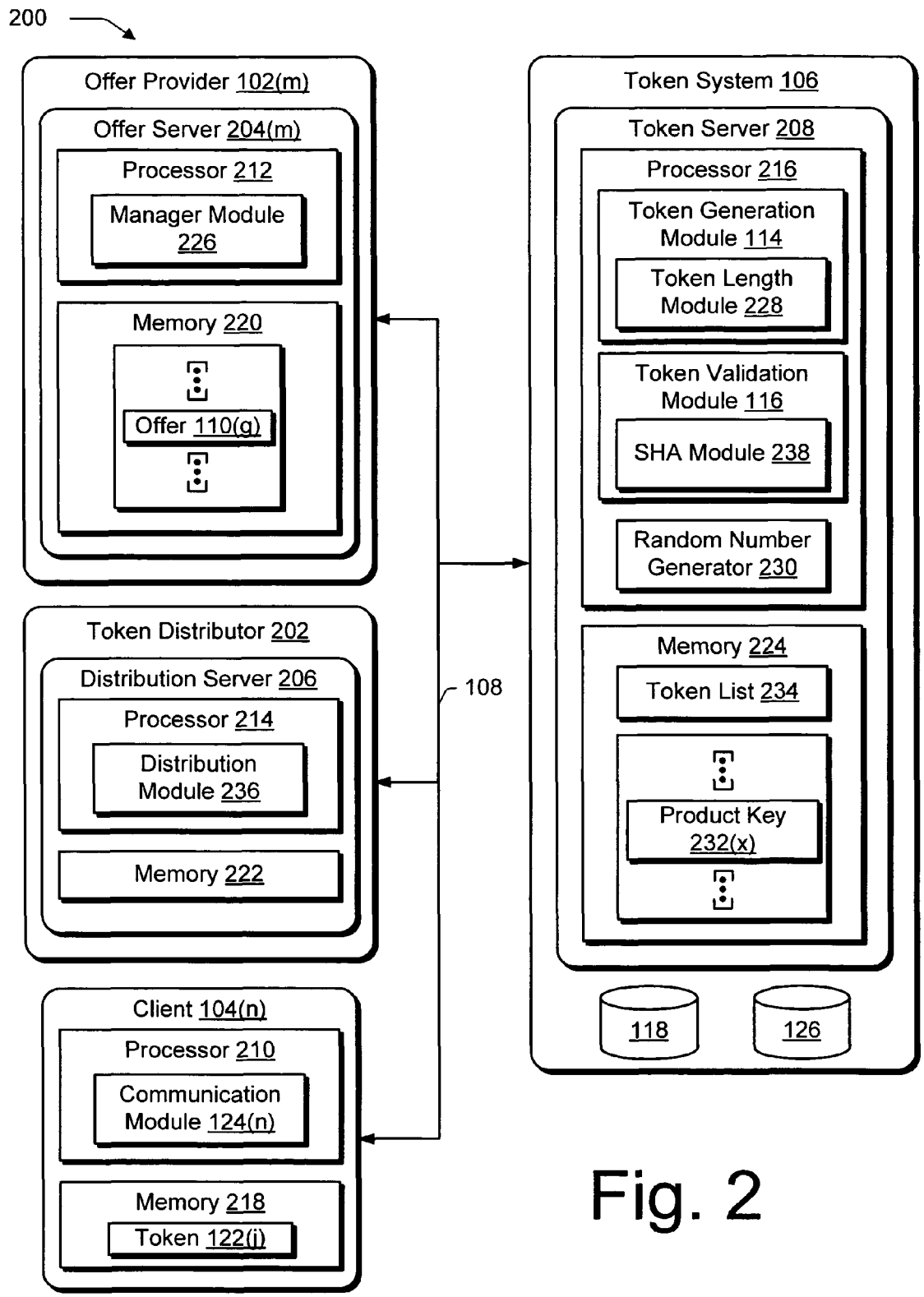
FIG. 2 is an illustration of a system in an exemplary implementation showing a plurality of offer providers, a plurality of clients, and a token system of FIG. 1 in greater detail.

FIG. 2 is an illustration of a system 200 in an exemplary implementation showing the offer provider 102(m), the client 104(n), and the token system 106 of FIG. 1 in greater detail. The system 200 also includes a token distributor 202 for distribution of tokens obtained from the token system 106, further discussion of which may be found later in this section. The offer provider 102(m), the token distributor and the token system 106 are illustrated as including, respectively, an offer server 204(m), distribution server 206, and token server 208. Further, the client 104(n), offer server 204(m), distribution server 206 and token server 208 are each illustrated as including a respective processor 210-216 and memory 218-224.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 218-224 is shown, respectively, for the client 104(n), offer server 204(m), distribution server 206 and token server 208, a wide variety of types and combinations of memory may be employed, such as random access memory (RAM), hard disk memory, removable medium memory, and so forth.

The offer provider 102(m) in this system 200 is illustrated as storing the plurality of offers 110(g) of FIG. 1 in memory 220. The plurality of offers 110(g) relate to the pluralities of goods and/or services 112(h) of FIG. 1 as previously described, such as to describe a time period for interacting with a service, a free trial period for use of a good, and so on. To manage the offers 110(g), the offer server 204(m) may include a manager module 226, which is illustrated as being executed on the processor 212 and is storable in memory 220. For example, the manager module 226 may be executed to generate and store the plurality of offers 110(g), such as through provision of a user interface for manipulation by a user to specify parameters of the offers 120(j), such as a time period (e.g., a valid time for use of the offer), amount (e.g., "10% off"), related good and/or service 112(h) of FIG. 1, and so on. Once generated, the manager module 226 may form a communication for transmitting one or more of the offers 110(g) for storage in the database 118 of the token system 106.

The token system 106 is illustrated as including a token server 208. The token server 208 is illustrated as executing the token generation module 114 and the token validation module 116 on the processor 216, both of which are also storable in memory 224. The token generation module 114, when executed, generates a token which corresponds to one or more of the plurality of offers 110(g). For example, the token generation module 114 may include a token length module 228 which computes a number of characters for inclusion in the generated token. To compute the number of characters, the token length module 228 may examine the offer 120(j) to determine a value of the offer. Based on this determination, the token generation module 114 generates a token having the determined number of characters. For instance, the token generation module 114 may obtain a random bit string through execution of a random number generator 230 and convert the random bit string to the determined number of alphanumeric characters. Further discussion of generation of tokens having varied numbers of characters may be found in relation to FIGS. 4 and 7.

In another instance, the token is one of a plurality of product keys 232(x), where "x" can be any integer from one to "X". Product keys may be implemented as unique serial number which are associated with a good or service. For example, product keys may be utilized for verification that a particular good was purchased (i.e., not pirated) by a consumer, such as a product key for software, a personal computer, and so on. In such an example, the product key itself may be utilized to leverage the existing distribution structure of the product and its product key, further discussion of which may be found in relation to FIGS. 3 and 5.

In a further instance, the token is obtained from a predefined token list 234 that is obtained by the offer provider 102(m). For example, the offer provider 102(m) itself may also generate tokens for communication to and verification by the token system 106. In such an instance, the offer provider 102(m) (and more particularly the offer server 204(m)) may execute a module having functionality similar to that of the token generation module 114.

The token generated by the token generation module 114 may be distributed in a variety of ways. For example, the system 200 of FIG. 2 is illustrated as including a dedicated token distributor 202. The token distributor 202 obtains tokens from the token generation module 114 and distributes them according to business rules specified by the corresponding offers 110(g). For example, the distribution server 206 may execute a distribution module 236 on the processor 214, which is also storable in memory 222, to form a communication having the token for distribution across the network 108 to the client 104(n). In another example, the distribution module 236 is executable to incorporate the token on a medium for distribution to the client 104(n) via other channels, such as through inclusion in an advertisement in a periodical (e.g., a flyer in a newspaper), and so on. Further discussion of token distribution may be found in relation to FIG. 5.

Upon receipt of the token 122(j) by the client 104(n), the token 122(j) may be communicated by the client 104(n) via the network 108 to the token system 106 for verification. For example, the token 122(j) may be processed by a secure hash algorithm (SHA) module 238 to generate a hash value. The generated hash value may then be compared through execution of the token validation module 116 with the plurality of hash values 128(k) of FIG. 1 stored in the database 126 to find a match. In an implementation, the plurality of hash values 128(k) stored in the database 126 were previously generated by the SHA module 238 from tokens generated by the token generation module 114. Thus, if the generated hash value matches a hash value in the database 126, the token was generated by the token generation module 114. This match may then be utilized to permit the provision of the offer corresponding to the token to the client 104(n), such as a discount for a referenced good or service. Further discussion of token validation may be founding relation to FIGS. 6 and 7.

Although the implementation of the offer provider 102(m), token system 106 and token distributor 202 in system 200 of FIG. 2 was described as utilizing stand-alone computing devices, the corresponding functionality may be provided collectively by a single system, combined across various other systems, and so on. Thus, the system 200 of FIG. 2 is an example of one of a variety of systems which are operable to employ the generation, distribution, and verification techniques described herein.

Exemplary Procedures

The following discussion describes generation, distribution and verification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
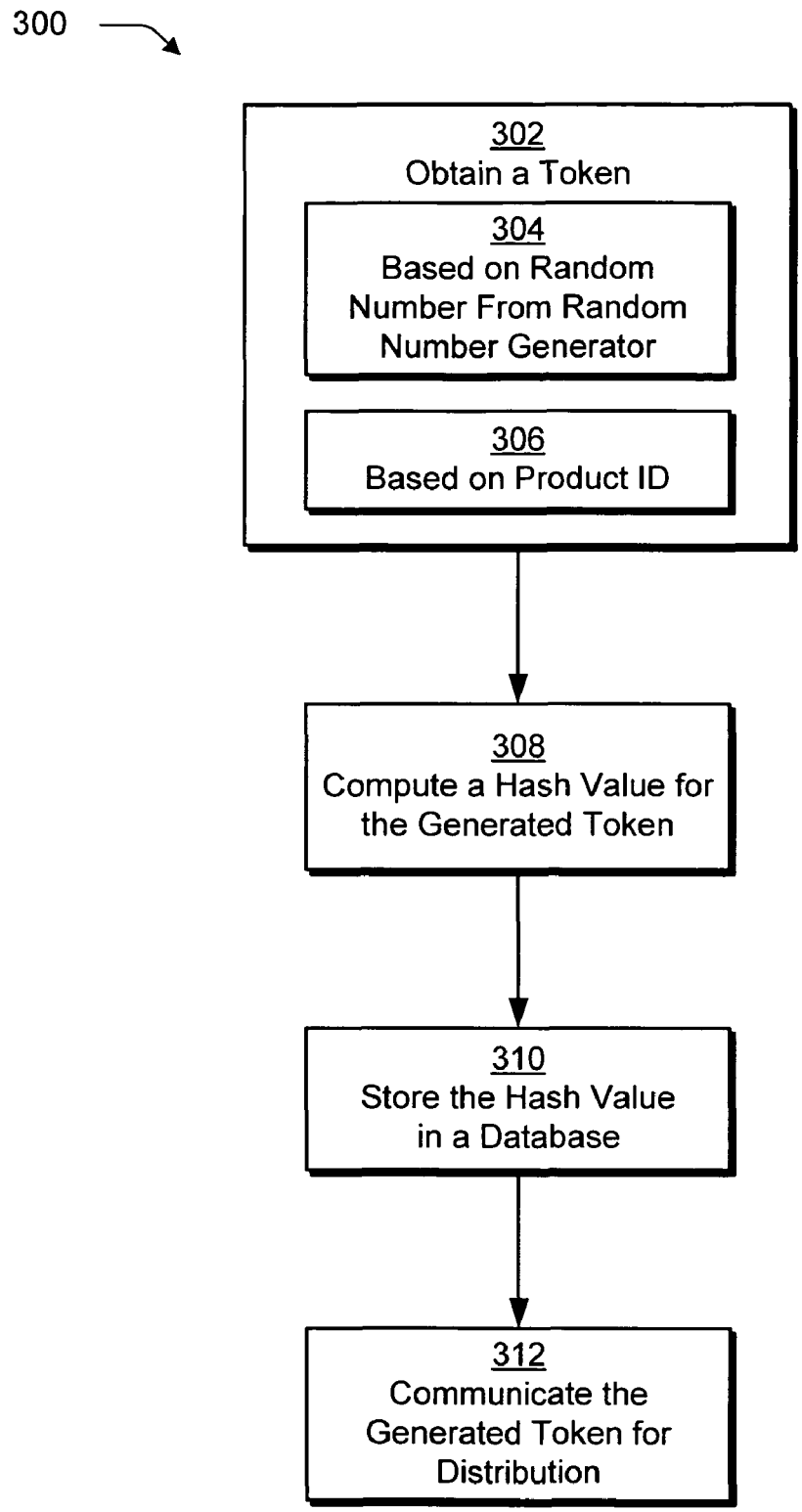
FIG. 3 is a flow diagram depicting a procedure in an exemplary implementation in which a token is generated, a hash value is computed from the generated token, and the hash value is stored in a database to protect the token from malicious parties.

FIG. 3 is a flow diagram depicting a procedure 300 in an exemplary implementation in which a token is generated, a hash value is computed from the generated token, and the hash value is stored in a database to protect the token from malicious parties. First, a token is obtained (block 302). As previously described in relation to FIG. 2, a token may be obtained in a variety of ways. For example, the token may be generated based on a random number obtained from the random number generator 230 (block 304). In another example, the token is based on a product key (block 306). For example, certain products may have established distribution channels for product keys, such as software, computer devices, and so on. Therefore, to leverage these distribution channels, the token may be based on the product key. In a further example, the token is computed to have a length (e.g., number of characters) based on a monetary value of a corresponding offer, further discussion of which may be found in relation to FIG. 4.

A hash value is then computed for the generated token (block 308). For example, the U.S. Secure Hash Algorithm Version 1.0 (SHA-1) may be utilized to compute what is generally considered a secure hash value of the generated token. The SHA-1 is generally considered secure because it is computationally infeasible to find a token which corresponds to the hash value, and it is unlike that two different tokens which produce the same hash value. Therefore, a change to a token during communication will likely result in a different hash value, the verification of which will fail when attempted. Although SHA-1 is described, other secure hash algorithms are also contemplated, such as successor versions of SHA-1. Further discussion of an exemplary technique for generation of a hash value utilizing SHA-1 may be found in relation to FIG. 7.

The computed hash value is then stored in a database (block 310). For example, as shown in FIG. 1, a database 126 may include a plurality of hash values 128(*k*) to protect the corresponding tokens from being discovered by malicious parties. Therefore, even if a malicious party obtains access to the database 126, it is computationally infeasible for the malicious party to derive the corresponding tokens.

Additionally, the generated token is communicated for distribution (block 312). For example, the token system 106 may communicate the token to the token distributor 202 of FIG. 2 over the network 108. The token distributor may then distribute the token in a variety of ways, further discussion of which may be found in relation to the following figure.

Figure 4:
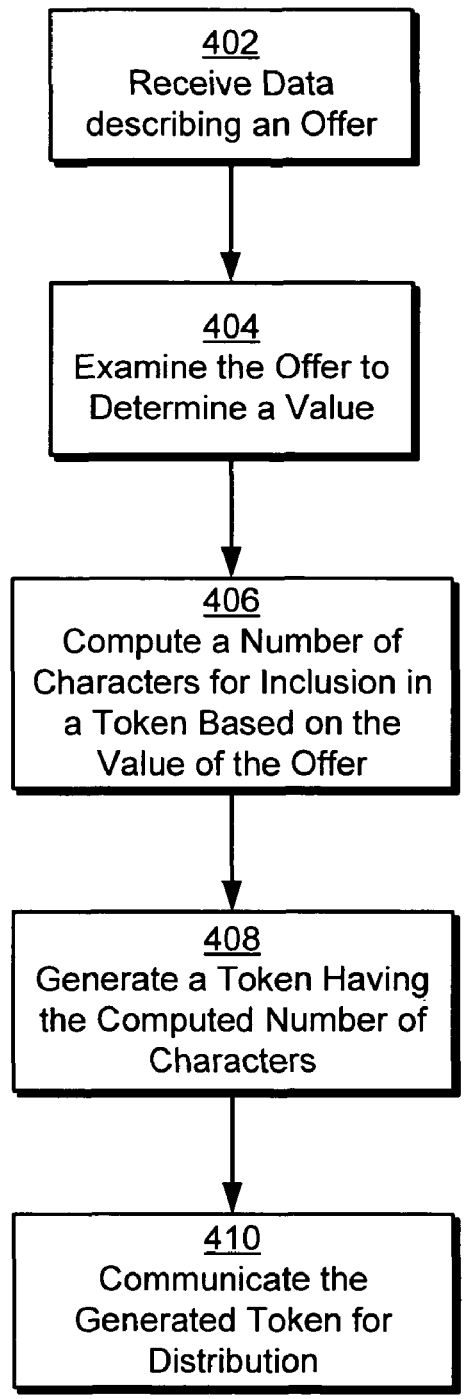
FIG. 4 is a flow diagram depicting a procedure in an exemplary implementation in which a number of characters for inclusion in a generated token is computed based on a monetary of an offer that corresponds to the token.

FIG. 4 is a flow diagram depicting a procedure 400 in an exemplary implementation in which a number of characters for inclusion in a generated token is computed based on a value of an offer that corresponds to the token. Data is received which describes an offer (block 402). For example, an offer 110(*g*) may be communicated from an offer provider 102(*m*) to the token system 106 (and more particularly the token generation module 114) via the network 108.

The offer is then examined to determine a value (block 404) of the offer. For example, the token generation module 114, when executed, may process characteristics of the offer, such as a monetary value of the offer (e.g., an amount of reduction in a price of a good or service, such as "10% off"), an amount of time the offer is valid, a number of intended recipients for the offer, relative "ease of entry" for implementation of the offer that is desired by the offer provider 102(*m*) (e.g., a score which indicates a degree of risk the offer provider 102(*m*) is willing to accept for dissemination of the offer 110(*g*)), and so on. A variety of other techniques may be utilized to determine the value. For example, the offer may include a predetermined value which is indicated by the offer provider 102(*m*), a user may manually examine the offer to arrive at a determined value, and so on.

Based on the determined value (block 404), a number of characters is computed for inclusion in a token (block 406) that corresponds to the offer. For example, as previously described, a token which has a greater number of characters is generally considered to be more secure, as it is harder to guess and more resistant to "brute force" attacks. However, such tokens are generally more difficult to type as the number of characters in the token increases, therefore possibly resulting in potential consumers forgoing the implementation of the offer based on the inconvenience of entering the token. Therefore, the token generation module 114 may generate tokens having various lengths (i.e., number of characters) which are based on a corresponding value of the offer which is represented by the token. For instance, a "coupon token" may have a relatively lesser value (e.g., "5% off purchases) and therefore the computed length of the token may also be relatively short, such as less than eight characters. However, a token that is redeemable for a service worth several hundred dollars may have a relatively high value. Therefore, such a token may have a computed length that is relatively great in length, such as more than 20 characters, to assure proper security in that it is computationally expensive to guess in terms of "brute force" attacks.

The number of characters may also be computed, in part, based on a wide variety of other considerations. For example, the length of the token may be based on "how" the token is to be entered. For instance, a token that is to be manually entered (e.g., listed in a print ad) may have fewer characters than a token that is entered using techniques which are relatively easier for the user to perform, such as through optical scanning, electromagnetic devices (e.g., a swipe card), and so on.

A token is then generated having the computed number of characters (block 408). For example, the token may be computed via the procedure 300 of FIG. 3. The generated token is then communicated for distribution (block 410), further discussion of which may be found in relation to the following figure.

Figure 5:
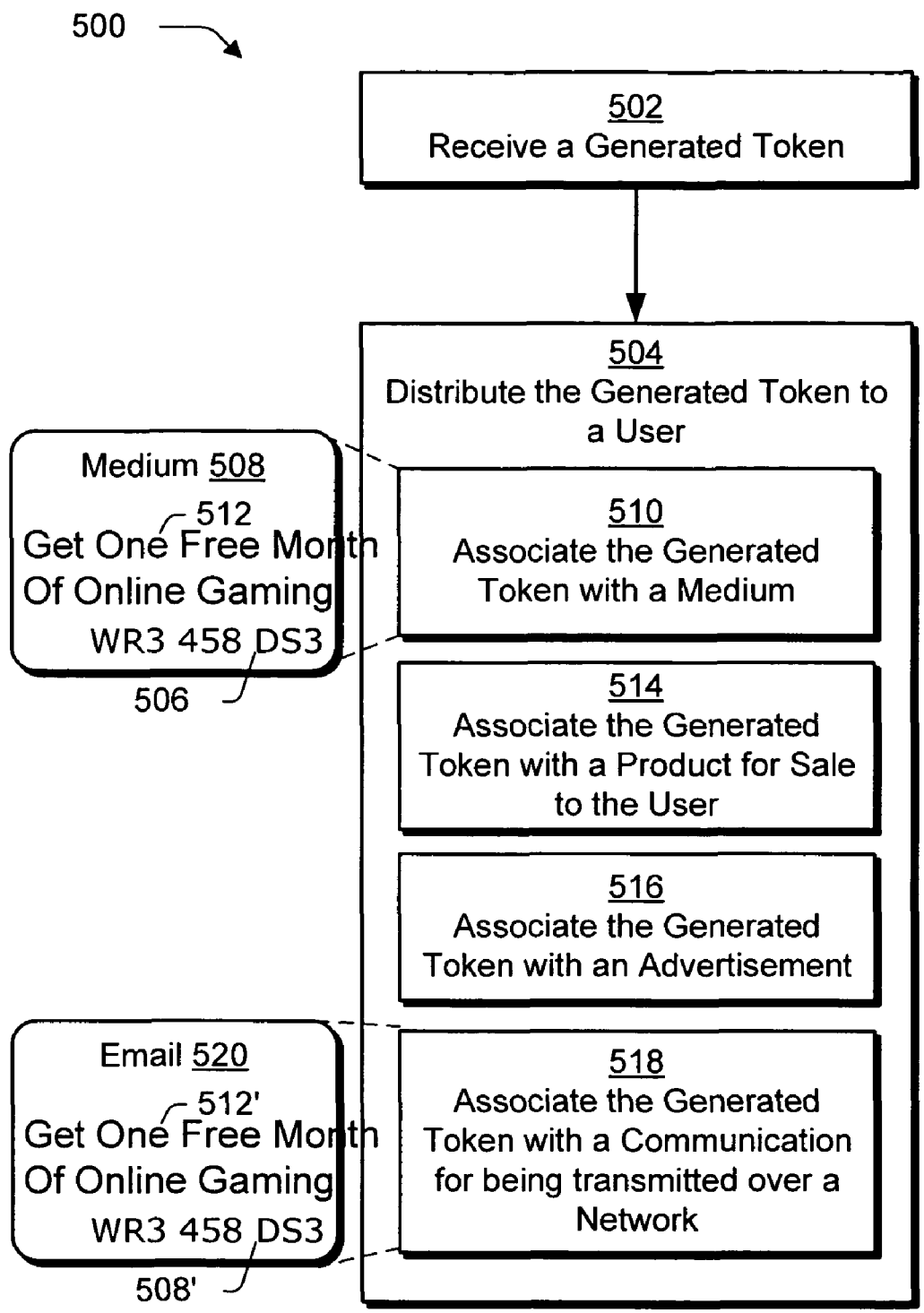
FIG. 5 is a flow diagram depicting a procedure in an exemplary implementation in which a token generated by either of the respective procedures of FIGS. 3 and 4 is distributed for implementation of a corresponding offer by a user.

FIG. 5 is a flow diagram depicting a procedure 500 in an exemplary implementation in which a token generated by either of the respective procedures 300, 400 of FIGS. 3 and 4 is distributed for implementation of a corresponding offer by a user. First, a generated token is received by a token distributor 202 (block 502). The token may be received in a variety of ways, such as communicated over the network 108, written to a computer-readable medium that is delivered to the token distributor 202, and so on.

The token distributor then distributes the generated token to a user (block 504). For example, the token distributor may associate the generated token 506 with a medium 508 (block 510). For instance, the medium 508 may be formed as a plastic card for inclusion with a computer-readable medium having an application for playing a game. The medium 508 may include a description 512 of an offer to "get one free month of online gaming" and the token 506. Therefore, to utilize the offer, the user may enter the token 506 via a controller of a game console for verification by the token system 106. The medium 508 may be configured in a variety of ways, such as a leaflet in a newspaper or other periodical, a swipe card having a magnetic strip for "swiping" the token, a postcard having a token configured for being optically scanned by a scanning device, and so on.

In another example, the generated token is associated with a product for sale to the user (block 514). For example, a box for containing a product may include the token for entry by the user. In a further example, the generated token is associated with an advertisement (block 516). For example, a periodical (e.g., a magazine, a newspaper, and so on) may include an advertisement for an offer for accessing a product or service. The advertisement may include the offer and a token for implementing the offer by a user, such as to get 10% off all online purchases, free shipping, and so forth. In yet another example, the generated token 508' is associated with a communication for being communicated over a network to the user (block 518). For instance, the communication may be configured as an email 520 which includes a description 512' of the offer and the token 508' for implementing the offer. Although a variety of examples have been discussed for distributing tokens, a wide variety of other implementations are also contemplated without departing from the spirit and scope thereof.

Figure 6:
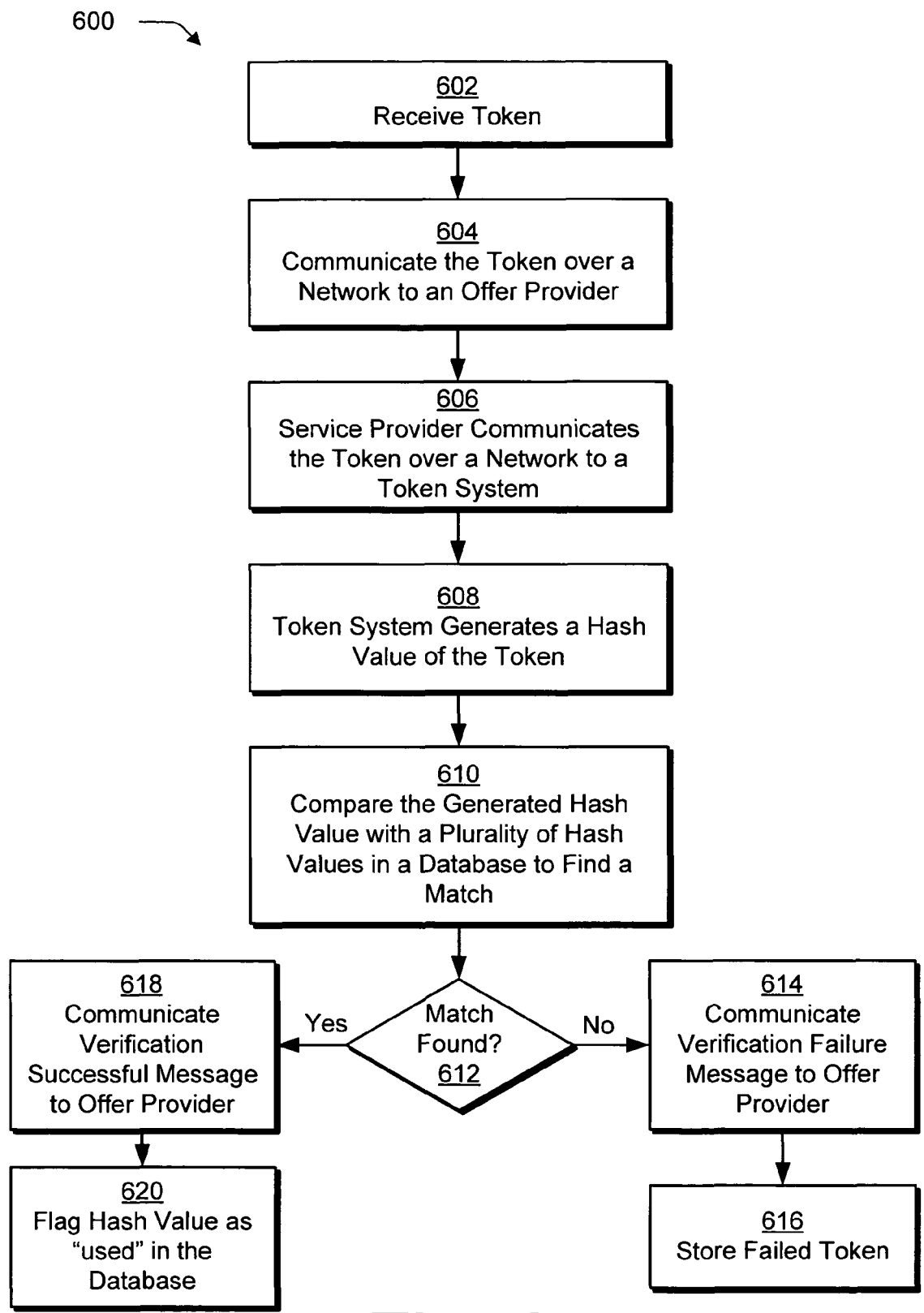
FIG. 6 is a flow diagram depicting a procedure in an exemplary implementation in which a token distributed via the procedure of FIG. 5 is verified for implementation of a corresponding offer.

FIG. 6 is a flow diagram depicting a procedure 600 in an exemplary implementation in which a token distributed via the procedure 500 of FIG. 5 is verified for implementation of a corresponding offer. First, a token 122(j) is received by the client 104(n) (block 602). The client 104(n) then executes the communication module 124(n) to communicate the token 122(j) over the network 108 to the offer provider 102(m) (block 604). The offer provider 102(m) then communicates the token 122(j) to the token system 106 over the network 108 for verification (block 606). In another implementation, the client 104(n) communicates the token 122(j) directly to the token system 106.

The token system 106 then generates a hash value of the token 122(j) (block 608). For example, the token system 106 may process the token using SHA-1 to obtain the generated hash value. The token system 106 then compares the generated hash value with a plurality of hash values 128(k) in a database 126 to find a match (block 610). If a match is not found (decision block 612), the token system 106 communicates a "verification failure" message to the offer provider 102(m) (block 614). Further, the token system 106 may store the failed token (block 616) to track which tokens have been submitted and failed, which may be used to track unauthorized possession of tokens. For instance, the token system 106 and/or the offer provider 102(m) may track which tokens were transmitted to which token distributors 202. Tokens which match or are similar to tokens provided to particular token distributors 202 may indicate a "weak" point in the distribution of the tokens, and therefore may require further security measures. Additionally, the stored failed token may be utilized for quick initial comparison to determine if it is being submitted again for verification, and if so, quickly track the submitter of the token, such as a malicious party that is not authorized to implement the offer referenced by the token.

If a match is found (decision block 612), the token system 106 communicates a "verification successful" message to the offer provider 102(m) (block 618). Thus, the offer provider is made aware that the verification is successful, and may permit the implementation of the offer for that user. The token system 106 may also "flag" the matching hash value 128(k) as "used" in the database (block 620). For instance, each hash value 128(k) in the database 126 may be configured for "one time" use. Therefore, after the hash value 128(k) is utilized, the hash value may be flagged, removed from the database 126, and so on such that if the matching token is resubmitted, the verification fails. In another instance, each token may be configured for use for a predetermined number of times. Therefore, a counter may be incremented each time the hash value is successfully utilized to verify a number of uses of the token. A wide variety of other techniques may be employed to track hash values, and consequently tokens, without departing from the spirit and scope thereof.

Figure 7:
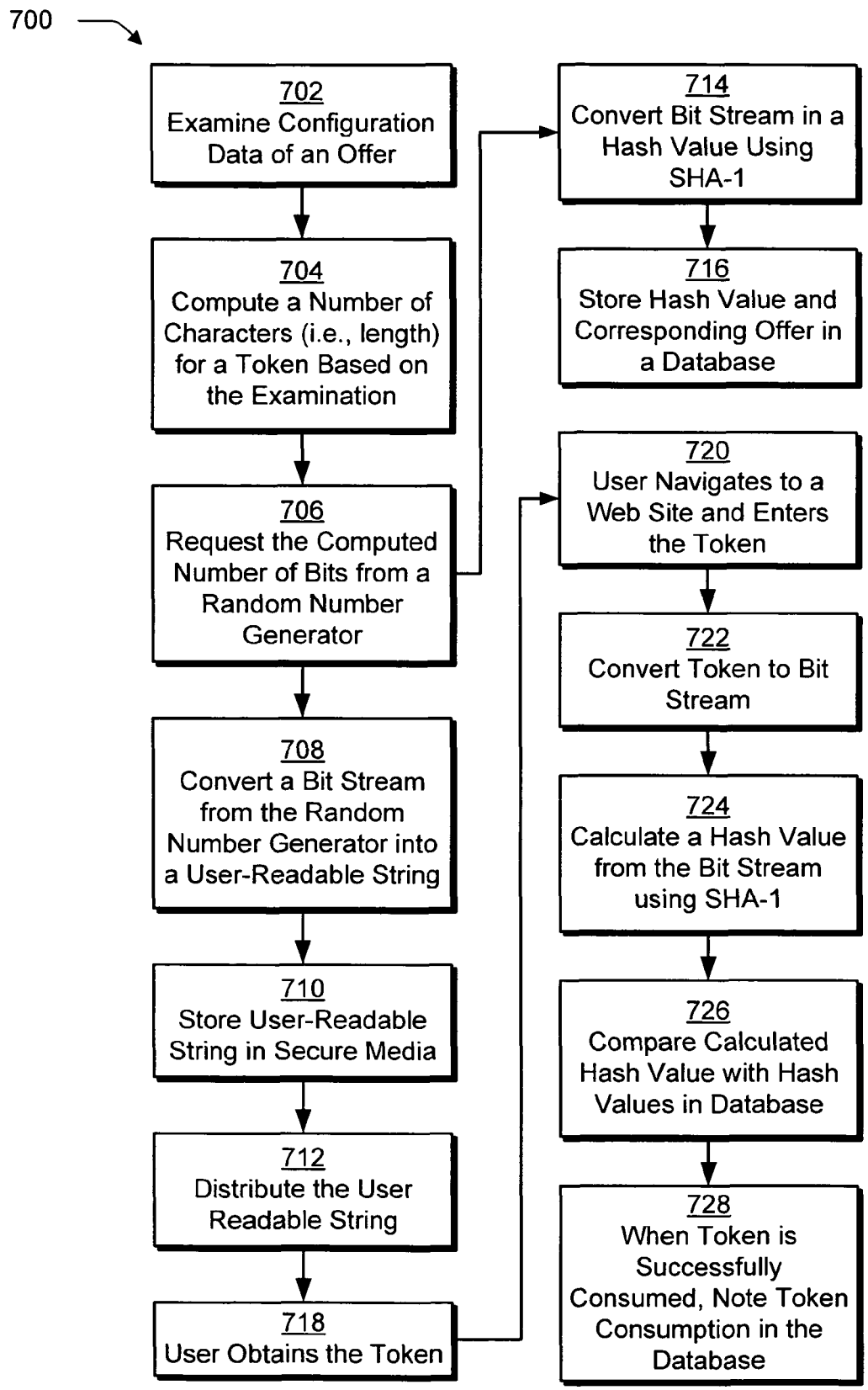
FIG. 7 is a flow diagram depicting a procedure in another exemplary implementation in which a token is generated, hash values are calculated via U.S. Secure Hash Algorithm Version 1.0 (SHA-1) and stored for use in verifying the token.

FIG. 7 is a flow diagram depicting a procedure 700 in another exemplary implementation in which a token is generated, hash values are calculated via SHA-1 and stored for use in verifying the token. As previously described, a token may be configured as a unique alphanumeric string that enables a user to implement offers, such as grants of special privileges to the user. Tokens may appear in several different forms, such as, prepaid cards, vouchers or coupons. Coupons are generally implemented using "short" tokens (e.g., less than 8 characters) that grants a privilege to any user knowing the token, such as 10% off of a retail price. A voucher is a token that grants a privilege for a specific user, such as a one month subscription to Jane Doe for continued consumer loyalty. A prepaid token is a token that can be redeemed by anyone for a good or service using an online system. For example, a prepaid token allows users to pay in advance for a subscription over a particular period of time. Thus, the prepaid token may act as a "proof of purchase" that entitles users for a subscription without other methods of payment.

In this implementation, the token generation process starts by examining configuration data for an offer (block 702). A number of characters (i.e., "length") for a token is computed based on the examination (block 704), such as whether the token relates to a coupon, a voucher, is prepaid, and so on. In this instance, the "length" of the token is expressed as a bit length. Based on this information, a computed number of random bits are requested from a random number generator (block 706).

If the required bit length is lower than 128 bits, to generate a random number in the range $<0, 2^{required\_token\_bit\_length-1}>$, "high-significance" bits are padded with zeros up to the length of 128 bits ($T_{128}$). For prepaid tokens, for instance, the required bit length is 96, and therefore zeros may be added to obtain a length of 128 bits.

A bit stream from the random number generator (i.e., the random number) is then converted to user-readable string (block 708), such as to include Latin characters and numbers. Continuing with the previous example, $T_{128}$ is converted to an alphanumeric string that is readily user readable such that it may be entered by the user. For instance, since some of the Latin characters and digits are similar in look or sound, therefore the following reduced character set having 24 characters may be utilized:

| Value | Alphanumeric character |
|---|---|
| 0 | B |
| 1 | C |
| 2 | D |
| 3 | F |
| 4 | G |
| 5 | H |
| 6 | J |
| 7 | K |
| 8 | M |
| 9 | P |
| 10 | Q |
| 11 | R |
| 12 | T |

| Value | Alphanumeric character |
|---|---|
| 13 | V |
| 14 | W |
| 15 | X |
| 16 | Y |
| 17 | 2 |
| 18 | 3 |
| 19 | 4 |
| 20 | 6 |
| 21 | 7 |
| 22 | 8 |
| 23 | 9 |

To convert the bit string token to a user-readable string, the bit string may be converted to base 24 using the above table. However, since tokens can be longer than 64 bits, such tokens may be split into two or more parts.

Bits 0-63, for instance, may be encoded separately from any remaining bits. For example, constructed strings are concatenated such that the first part is a base 24 alphanumeric code of bits 0-63 and second part has a base which corresponds to the remaining 64 bits (e.g., 64-127). The first part is fourteen characters long and encodes the first 64 bits. In this example, the second part has a variable length and depends on a number of remaining data to be coded. An exemplary formula to calculate alphanumeric string length based on the number of bits to be stored may be represented as follows:

$$\text{String\_length} = \text{RoundUp}(\log(2^{number\_of\_bits})/\log(24))$$

Therefore, for tokens longer than 64 bits, the token may be formed from the concatenation of the following strings:

ToBase24(value, number of significant bits), ToBase24(remaining bits 64 to token length, number of remaining bits)

The operation "ToBase24" calculates a number of alphanumeric positions, which are sufficient to store any value having a "number of significant bits".

The user-readable string is then stored in secure media (block 710), and using secure distributions, it is distributed to a user (block 712). For example, the string may be distributed via online communication, delivered to a store in a form of a prepaid scratch card, and so on.

The token obtained from random number generator is converted into SHA-1 hash value (block 714) and stored into a database (block 716). For example, the following equation represent the calculation of a SHA-1 keyless hash value from $T_{128}$:

$$H_{160} = \text{SHA1}(T_{128})$$

The calculated hash value $H_{160}$ is then stored in a "token_instance table" in a token database. In this example, since the hash value is 160 bits long, it is stored as 3 separate columns, $\text{DBHash}_1$=bits 0-63 of $H_{160}$, $\text{DBHash}_2$=bits 64-127 of $H_{160}$, $\text{DBHash}_3$=bits 128-160 of $H_{160}$. The database acts as a token validation store, and may include a corresponding offer, for which, it was generated. As shown in the procedure 700 of FIG. 7, the conversion and storage of the hash value (blocks 714, 716) may be performed before, during, and/or after the conversion, storage, and distribution of the user-readable string (blocks 708-712).

The user then obtains the token (block 718) from the distribution of the user readable string (block 712). For example, the user may purchase the token from a retail store, obtain the token as a "proof of purchase" in order to redeem it for access to goods or services, and so on. In order to redeem the token, the user may navigate to an online system (e.g., a web site) and enter the token (block 720) to implement a corresponding offer. A reverse process may then be applied in order to validate the token.

The token, for instance, may be converted back to a bit stream (block 722). A hash value is then calculated from the bit stream using SHA-1 (block 724). If the token length is 14 characters or less, it represents a token of length up to 64 bits. If the length is longer than 14 characters, it is decoded from two parts. As stated above, the first 14 characters encode the first 64 bits, and the remaining characters encoding remaining high order bits. The converted value is padded with 0's to the full length of 128 bits. The calculated hash value is compared with the hash values in the token validation store (block 726). After successful purchase of the offer and consumption of the token, the instance of token consumption is stored in the token validation store (block 728).

Figure 8:
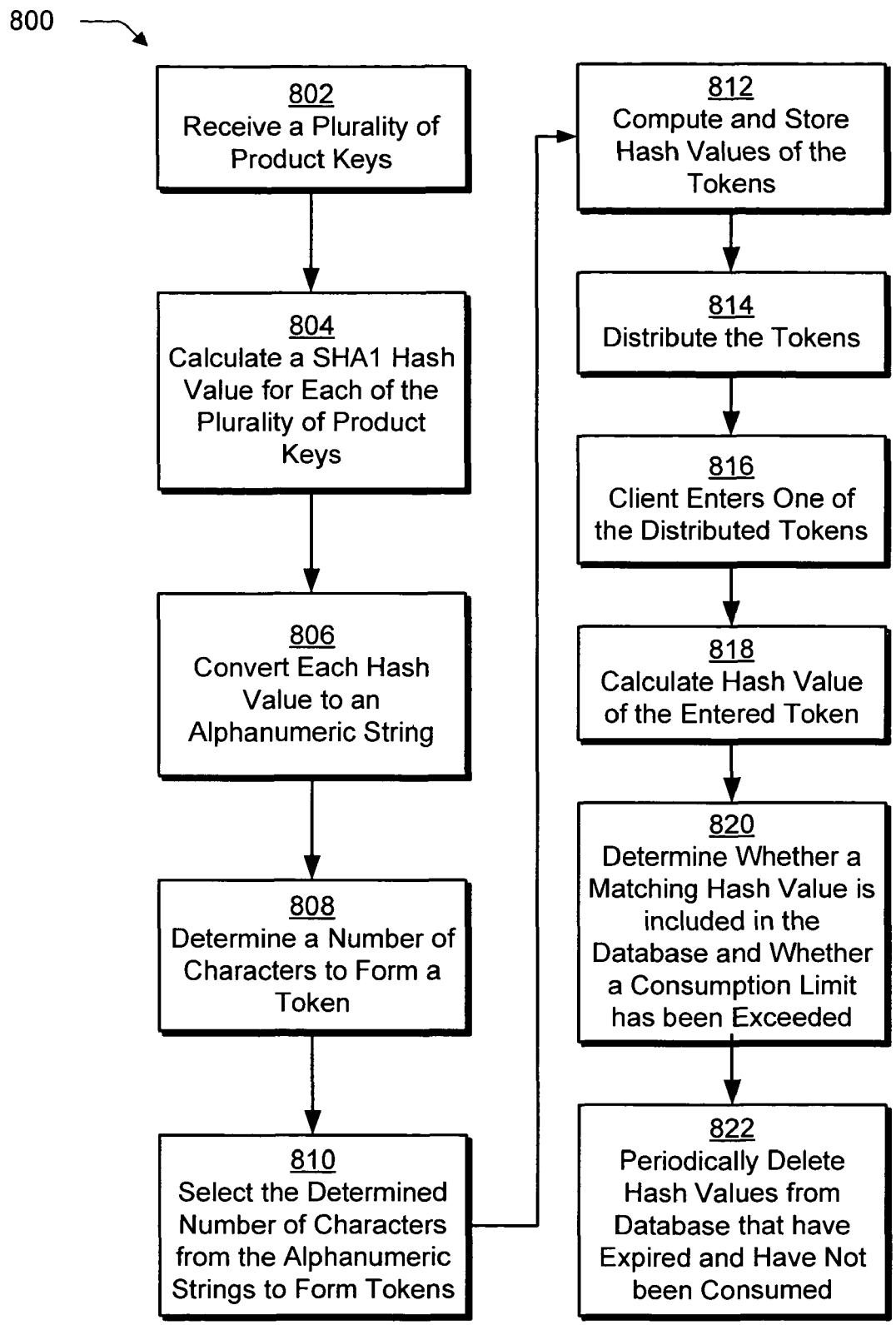
FIG. 8 is a flow diagram depicting a procedure in an exemplary implementation in which a token is generated from at least a portion of a hash value of a product key, and a hash value of the token is stored for validating the token.

FIG. 8 is a flow diagram depicting a procedure 800 in an exemplary implementation in which a token is generated from at least a portion of a hash value of a product key, and a hash value of the token is stored for validating the token. First, a plurality of product keys is received (block 802). In this implementation, each of the product keys includes 25 characters selected from a twenty-four character table to avoid confusion with characters that look similar and/or sound similar.

A product key, for example, may be formatted in five groups of five characters, with dashes separating each group, an example of which is shown as follows:

BBH2G-D2VK9-QD4M9-F63XB-43C33

The product key may incorporate a variety of security elements and may be represented as 114 bits of binary data. For instance, when the dashes are removed from the above example, the 25-characters may be thought of as a 25-digit number in base 24. Further, the 25-digit, base-24 number may be converted to a number in base 2. Thus, a 25-digit, base-24 number can encode 114 binary digits. Like numbers in base 10, the first character can be the most significant digit and the last character is the least significant. In an implementation, each product key includes data stored within the binary representation, which may include (1) a group ID (part of the 83 bits of security information); (2) a 9-digit Sequence Number; and (3) an upgrade digit.

The procedure 800 then calculates a SHA1 hash value for each of the plurality of product keys (block 804). For example, the following code may be utilized to generate the hash value:

```
string ComputeHash( )
{
    if( hashFunction == null )
    {
        hashFunction = new SHA1CryptoServiceProvider( );
    }
    // Get a Null terminated string associated with the token
    byte[ ] stringToHash = (new UnicodeEncoding( )).GetBytes
(productKey+ "\0");
    byte[ ] hash = hashFunction.ComputeHash(stringToHash);
}
```

SHA1CryptoServiceProvider references a module for generating a SHA1 hash value. In this instance, the generated hash value has 160 bits.

The procedure 800 then converts the hash values to alphanumeric strings (block 806). First, the 160-bit hash value is converted to twenty characters, with 8 bits for each character. Each converted character may be thought of as a number from 0 to 255. Each converted character is then converted to a base 24 number, such as by utilizing the spreadsheet formula "MOD(NUMBER, 24)", after which, the base 24 number is converted to an alphanumeric string according to the following conversion table.

| Value | Alphanumeric character |
|---|---|
| 0 | L |
| 1 | C |
| 2 | D |
| 3 | F |
| 4 | G |
| 5 | H |
| 6 | J |
| 7 | K |
| 8 | M |
| 9 | P |
| 10 | Q |
| 11 | R |
| 12 | T |
| 13 | V |
| 14 | W |
| 15 | X |
| 16 | Y |
| 17 | 2 |
| 18 | 3 |
| 19 | 4 |
| 20 | 6 |
| 21 | 7 |
| 22 | 8 |
| 23 | 9 |

It should be noted that this conversion table differs from the previously described conversion table by elimination of the letters "B", "S", "O", and "Z" and the numbers "8", "5", "0", and "2", which may appear similar, respectively, to avoid potential confusion by a user. In an implementation, an alphabet is utilized that does not contain vowels to reduce the risk of including an "offensive" string.

A number for characters is then determined for forming a token (block 808). For example, the number may be predetermined such that the "X" (e.g., 12) characters are then selected for use as the token. In another example, the number is dynamically determined based upon a number of tokens for output in conjunction with one or more offers. For instance, it is possible that the above generation algorithm may generate tokens which cause collisions, i.e., that two or more different product key generate hash values that generate matching tokens. The chances of collision are determined by the number of unique tokens in the sample space and the number of tokens to be generated.

To calculate the number of unique tokens in the sample space, the bit length is first determined. For instance, the "X"-character token may be thought of as an "X"-digit number in base "Y". This "X"-digit, base "Y" number can therefore be converted to a number in base 2. For example, an "X"-digit, base "Y" number can encode "Z" binary digits. "Z" can be calculated by utilizing either of the following spreadsheet formulas:

ROUNDDOWN(LOG(POWER($Y,X$),2),0);or

ROUNDDOWN($X$*LOG($Y$,2),0).

For example, the number of unique tokens in the sample space may be represented as: $K=2^{Bit\ Length}$. To calculate the number of tokens needed to expect a collision, a "birthday attack" problem may be utilized. The "birthday attack" refers to a class of brute-force attacks, in which, if some function, when supplied with a random input, returns one of k equally-likely values, then by repeatedly evaluating the function for different inputs, a duplicate output is expected after approximately $1.2\ k^{1/2}$ trials. Accordingly, the number of tokens which are needed to have fifty percent or greater chance of collision is $C=1.2K^{1/2}$. Examples of corresponding alphabets, lengths, bit length of token, sample space, and a number of tokens are shown in the following table.

| Alphabet | Length | Bit Length | Sample Space | Collision |
|---|---|---|---|---|
| 24 | 10 | 45.84962501 | 6.340338E+13 | 9,555,149 |
| 24 | 11 | 50.43458751 | 1.521681E+15 | 46,810,478 |
| 24 | 12 | 55.01955001 | 3.652035E+16 | 229,323,571 |

The last column in the above table describes how many tokens are needed to have a greater than a fifty percent chance that at least two product key hash values will generate the same token.

It should be apparent that the same input (e.g., product key) will generate the same output, e.g., a token. Thus, the total number of unique outputs is also dependent on the input. For example, an algorithm that can generate $2^{160}$ outputs in theory can generate only $2^{55}$ unique outputs if only $2^{55}$ unique inputs are possible. Accordingly, in an implementation a number of unique inputs is provided that equals or exceeds the number of outputs (e.g., tokens) required.

The number of tokens may also be selected based on security considerations. For example, the number of characters in a token may also be based on a likelihood that a hacker can guess a token that is valid and that has a redeemable hash value. Thus, the question is how many redeemable tokens can be distributed at any one time before a hacker can guess a redeemable token to receive unauthorized access to goods or services.

For example, a uniqueness of the tokens may be addressed by determining whether any two inputs have the same hash value, as shown in the following equation, where M is the input and H is the hash function:

$$H(M)=H(M')$$

Thus, the security consideration is that given the hash value of an input, H(M), find another input M', such that H(M)=H(M').

The table of FIG. 9 describes the probability that an attacker can guess one redeemable token given a total number of redeemable tokens in circulation and a number of guesses attempted by the attacker. The formula for the last column of the table 900 is as follows:

$$1-POWER((D5-E5)/D5,G5)E5/D5*G5$$

The value "D5" represents the sample space, the value "E5" represents the redeemable quantity, and the value "G5" represents the number of guesses. The value "(D5−E5)/D5" describes the probability of the attacker correctly guessing a token that is not redeemable. The value "G5" is the number of guesses attempted by the attacker. The expression "POWER((D5−E5)/D5,G5)" captures the probability of when the attacker attempts "G5" guesses, with none of guesses resulting in a redeemable token. The following formula captures the probability that at least one attempt results in a valid redeemable token:

$$1-POWER((D5-E5)/D5,G5)$$

The above formula assumes that guesses are independent such that an attacker does not take a previous result into account and may repeat guesses in subsequent attempts. The above formula is a close approximation when G5<<D5, that is, the number of guesses is significantly less than the sample space.

In another example, the following equation may be utilized to calculate a minimum length (e.g., number of characters) required given a redeemable quantity of tokens and tolerable "probability of success" guesses, which is shown as follows:

$$LOG(E2/I2, A2)$$

In the above equation, the value "E2" represents the redeemable quantity, or total number of valid redeemable tokens that can be distributed at one time. The value "I2" is the probability that an attacker can guess one valid token, and "A2" is the number of characters in the alphabet.

The determined number of characters (block 808) is then selected from each of the alphabetic strings to form tokens (block 810). Hash values of the tokens are then computed and stored (block 812) as previously described in relation to FIG. 3. Continuing with the previous example, once tokens are generated, hash values of the tokens are imported to the token database, such as the database 126 of FIG. 1. For example, SHA1 hash values may be calculated through execution of the below listed code:

```
string ComputeHash( )
{
    if( hashFunction == null)
    {
        hashFunction = new SHA1CryptoServiceProvider( );
    }
    // Get a Null terminated string associated with the token
    byte[ ] stringToHash = (new UnicodeEncoding( )).GetBytes
(Short Token + "\0");
    byte[ ] hash = hashFunction.ComputeHash(stringToHash);
}
```

As previously described, SHA1CryptoServiceProvider( ) represents code for computing a hash value according to SHA 1.

In an implementation, during the import process, tokens which match previously generated tokens are excluded from import. The excluded tokens may be added to a list for output to the billing system for further analysis, such as for use by support tools and/or customer service representatives for consideration of replacement tokens, such as in response to a customer complaint of an unredeemable token.

The tokens may then be distributed (block 814) for use by clients as previously described. Therefore, once a client receives a token, the client may enter the "X"-character token (block 816), such as during login. A hash value is then calculated from the token (block 818) and a determination is made as to whether a matching hash value is included in the hash database (e.g., database 126 of FIG. 1) and that a consumption limit for that token has not been exceeded (block 820). In an implementation, the token system 106 (and more particularly the token generation module 114) is executable to delete hash values that have expired and have not been consumed (block 822).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system comprising:
a token server including:
a token generation module implemented by a processor executing first instructions stored in memory at the token server, the token generation module configured to:
receive, from an offer server via a network, a communication of an offer;
examine the offer to determine a monetary value of the offer;
calculate an alphanumeric character length that corresponds to the monetary value of the offer and corresponds to a redeem method by which the offer will be redeemed by a user;
generate, via a random number generator, a number of random bits based on the alphanumeric character length;
generate a token by converting the random bits into characters according to a base-24 conversion, to create the token using characters drawn from a 24-character set, the random bits converted into characters by encoding bits 0-63 separately from bits in excess of 64 bits and by concatenating two strings, one of fixed 14-character length and one of a variable length depending on the monetary value of the offer;
hash the random bits to generate a first hash value;
store the first hash value in a database for validation of a token received from the user; and
provide the token to a token distributor for distribution to the user in accordance with a rule specified by the offer.

2. A system as described in claim 1, further comprising a token validation module implemented by the processor executing second instructions stored in the memory at the token server, the token validation module configured to:
receive the token from the user;
calculate a second hash value from the token entry; and
compare the second hash value with the first hash value to determine a validity of the token entry.

3. A system as described in claim 1, further comprising a token validation module implemented by the processor executing second instructions stored in the memory at the token server, the token validation module configured to
receive the token entry from the user;
calculate a second hash value from the token entry;
compare the second hash value with the first hash value to determine that the token entry is invalid; and
store the invalid token entry to an invalid token database when the comparing the second hash value with the first hash value determines that the token entry is invalid.

4. A system as described in claim 1, wherein the token distributor distributes the token to the user by sending the token to the user's computer in accordance with the rule specified by the offer.

5. A system as described in claim 1, wherein the random alphanumeric string includes a first part encoded using a first base alphanumeric code and a second part is encoded using a second base alphanumeric code, the first base alphanumeric code being different from the second base alphanumeric code.

6. A system as described in claim 5, wherein the first part is encoded using the first base alphanumeric code in accordance with the following table:

| Value | Alphanumeric character |
| --- | --- |
| 0 | B |
| 1 | C |
| 2 | D |
| 3 | F |
| 4 | G |
| 5 | H |
| 6 | J |
| 7 | K |
| 8 | M |
| 9 | P |
| 10 | Q |
| 11 | R |
| 12 | T |
| 13 | V |
| 14 | W |
| 15 | X |
| 16 | Y |
| 17 | 2 |
| 18 | 3 |
| 19 | 4 |
| 20 | 6 |
| 21 | 7 |
| 22 | 8 |
| 23 | 9 |

7. A system as described in claim 1,
wherein the token server is in communication with a plurality of offer servers.

8. Computer-readable storage media having computer-readable program code embodied therein, the computer-readable program code adapted to the executed by a processor to implement a method, the method comprising:
implementing, by the processor, a token generation module for generating tokens;
receiving, by the processor, a communication including an offer, the offer providing information for generating the token;
determining, by the processor, a value of the offer based at least in part upon a monetary value of the offer;
generating, by the processor, a random alphanumeric string representing a token that provides value to a user in an online commerce system, the token created by converting random bits into characters in base-24, to create the token using characters drawn from a 24-character set, the random bits converted into characters by encoding bits 0-63 separately from bits in excess of 64 bits and by concatenating two strings, one of fixed 14-character length and one of a variable length depending on the monetary value of the offer, the token having a character length that correlates to the monetary value of the offer and represents the offer to the user;
providing the token to a token distributor for distribution to the user in accordance with a rule specified with the communication of the offer;
receiving a validation communication including the token from the user; and
hashing the token received from the user to determine a validity of the token received from the user.

9. The computer-readable storage media according to claim 8, wherein the hashing the token received from the user comprises:
generating a first hash value for the random alphanumeric string using a secure hash algorithm (SHA);
generating a second hash value for the token received from the user; and
storing an invalid token entry in a database when the first hash value is not equal to the second hash value.

10. The computer-readable storage media according to claim 8, wherein the generating the token generates the token by a token server in communication with an offer server and a computer of the user via a network.

11. The computer-readable storage media according to claim 8, wherein the hashing the token received from the user further comprises:
converting the token received from the user into a bit stream; and
calculating a hash value from the bit stream using a secure hash algorithm (SHA) to determine validity of the token received from the user.

12. The computer-readable storage media according to claim 8, wherein the generating the random alphanumeric string utilizes a conversion table having a number of alphanumeric characters that matches a numeric base to generate the random alphanumeric string.

13. The computer-readable storage media according to claim 8, further comprising storing a hash value of the random alphanumeric string representing the token to a database.

14. The computer-readable storage media according to claim 8, wherein the generating the random alphanumeric string representing the token generates a plurality of alphanumeric strings representing the token, the character length of each of the plurality of alphanumeric strings based on a number of the tokens which are generated in conjunction with the offer.

15. The computer-readable storage media according to claim 8,
wherein the processor is in communication with a plurality of offer providers that provide different offers, and
wherein the token generation module is configured to generate a plurality of alphanumeric strings representing the different offers, each of the plurality of alphanumeric strings based upon characteristics of each of the different offers received from each of the plurality of offer providers.

16. A computing device comprising:
a processor; and
a memory coupled to the processor, the memory comprising computer-program instructions executable by the processor for:
examining configuration data in an offer;
computing a number of characters to be used in each of a plurality of tokens, the number of characters based on the examination;
requesting a number of bits from a random number generator for each of a plurality of tokens, the number of bits sufficient to construct each of the plurality of tokens having the computed number of characters;
creating each of the plurality of tokens by:
segregating bits obtained from the random number generator into two groups of bits, the groups including bits 0-63 and bits 64 and onward;
converting the two groups into base 24, to create the tokens using characters drawn from a 24-character set; and
concatenating two strings to form a token, one string of fixed 14-character length obtained from the conversion of the group of bits 0-63 into base 24 and one string of a variable length obtained from the conversion of the group of bits 64 and onward into base 24, the variable length based on the number of characters computed and based on the examination;

generating a hash value of each of the plurality of tokens;
importing the hash value generated for each of the plurality of tokens into a database;
distributing the plurality of tokens to a plurality of clients;
receiving tokens from clients;
converting each of the received tokens into a bit stream using a reverse of the base 24 conversion formula;
hashing the bit streams;
comparing the hashed bit streams to the imported hash values in the database;
validating hashed received tokens that match hash values in the database;
storing hashed received tokens that do not match hash values in the database.

* * * * *